United States Patent
Bhagee et al.

(10) Patent No.: US 12,298,862 B2
(45) Date of Patent: May 13, 2025

(54) MULTI-CHANNEL BACKUP SYSTEM

(71) Applicant: Rubrik, Inc., Palo Alto, CA (US)

(72) Inventors: Vaibhav Bhagee, Delhi (IN); Abhishek Goyal, Punjab (IN); Nicolas Groh, Marignac Laspeyres (FR); Kshitiz Jain, Bengaluru (IN); Nitin Rathor, Mountain View, CA (US); Sankaran Sivathanu, Chennai Tamilnadu (IN); Toshad Salwekar, Palo Alto, CA (US); Alok Srivastava, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 152 days.

(21) Appl. No.: 17/526,288

(22) Filed: Nov. 15, 2021

(65) Prior Publication Data
US 2023/0105187 A1    Apr. 6, 2023

(30) Foreign Application Priority Data
Sep. 27, 2021  (IN) .............................. 202141043689

(51) Int. Cl.
*G06F 11/14*    (2006.01)
*G06F 16/182*    (2019.01)

(52) U.S. Cl.
CPC ........ *G06F 11/1464* (2013.01); *G06F 16/182* (2019.01); *G06F 2201/84* (2013.01)

(58) Field of Classification Search
CPC . G06F 11/1464; G06F 16/182; G06F 2201/84
See application file for complete search history.

(56) References Cited

U.S. PATENT DOCUMENTS

| | | | | |
|---|---|---|---|---|
| 9,830,082 | B1* | 11/2017 | Srinivasan | G06F 9/45558 |
| 2008/0147997 | A1* | 6/2008 | Littlefield | G06F 11/1464 |
| | | | | 707/E17.032 |
| 2010/0169587 | A1* | 7/2010 | Atluri | G06F 11/1471 |
| | | | | 711/155 |
| 2016/0063029 | A1* | 3/2016 | Mu | H04L 67/1097 |
| | | | | 707/620 |
| 2016/0224434 | A1* | 8/2016 | Winokur | G06F 11/14 |
| 2016/0239388 | A1* | 8/2016 | Joseph | G06F 11/1469 |
| 2016/0350015 | A1* | 12/2016 | Luo | G06F 16/00 |
| 2017/0315872 | A1* | 11/2017 | Prabhu | G06F 16/122 |
| 2017/0315877 | A1* | 11/2017 | Kaplingat | G06F 11/1458 |
| 2018/0095915 | A1* | 4/2018 | Prabhakar | G06F 3/067 |
| 2022/0058267 | A1* | 2/2022 | Chow | G06Q 30/0282 |

* cited by examiner

Primary Examiner — Pierre M Vital
Assistant Examiner — Jedidiah P Ferrer
(74) Attorney, Agent, or Firm — Holland & Hart LLP

(57) ABSTRACT

Methods, systems, and computer programs are presented for backing up data to a distributed multichannel storage system. One method includes an operation for detecting, by a distributed backup system (DBS), a request for backing up data from a host to the distributed backup system. The DBS sends a request to a backup agent executing at the host to initiate the backup. The backup agent mounts an endpoint for writing to the DBS and executes a script that writes the data for the backup to the endpoint. Further, the method includes operations for creating a file system stack at the DBS associated with the endpoint, storing data received by the file system stack at the DBS, and detecting, by the DBS, an end of the backup. The DBS sends a command to the backup agent to end the backup and terminates the file system stack at the DBS.

20 Claims, 13 Drawing Sheets

MULTI-CHANNEL BACKUP SYSTEM

CROSS-REFERENCE TO RELATED APPLICATIONS

This application claims priority under 35 U SC. § 119 to Indian patent application 202141043689, filed Sep. 27, 2021, the disclosure of which is incorporated herein by reference in its entirety.

TECHNICAL FIELD

The subject matter disclosed herein generally relates to methods, systems, and machine-readable storage media for providing backups in a storage system.

BACKGROUND

The volume and complexity of data that is collected, analyzed, and stored are increasing rapidly overtime. The computer infrastructure used to handle this data is also becoming more complex, with more processing power and more portability. As a result, data management and storage are becoming increasingly important.

Databases provides tools for backing up hosts to the database, which may include cloud implementations. However, some implementations are complex and required considerable development and maintenance of the backup system (e.g., scripts executing on the hosts). Additionally, implementing service level agreements (SLAs) may be complicated and expensive for users that manage the backup of systems themselves.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to backing up data to a distributed multichannel storage system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, a Cloud Data Management (CDM) system is used for backing up hosts. The CDM provides Managed Volumes (MV), which are mountable endpoints for writing data on the host (e.g., an endpoint that appears as a drive on the local host). A backup agent of the CDM is installed in the host to control backup operations on the host to provide SLAs and providing ease-of-use to clients that do not have to be involved in the day-to-day backup operations. The backup agent may perform multiple operations, such as interacting with the CDM for initializing the backup from the host, writing sequential data to a CDM cluster, deduplicating stored files, reading from backed up files, inquiring about the backed-up files, and requesting deletion of the backed-up files.

Further, the mount endpoints for backing up data are not always up and are brought up when a backup is needed. This way, the number of active volumes is greatly reduced, which enables the CDM to support a larger number of volumes and improves writing throughput. Further, managed volumes provide a generic solution that works with many types of servers and databases and is flexible for providing backups in many situations.

One method includes an operation for detecting, by a distributed backup system, a request for backing up data from a host to the distributed backup system. The distributed backup system sends a request to a backup agent executing at the host to initiate the backup. The backup agent mounts an endpoint for writing to the distributed backup system and executes a script that writes the data for the backup to the endpoint. Further, the method includes operations for creating a file system stack at the distributed backup system associated with the endpoint, storing data received by the file system stack at the distributed backup system, and detecting, by the distributed backup system, an end of the backup. The distributed backup system sends a command to the backup agent to end the backup and terminates the file system stack at the distributed backup system.

Figure 1A:
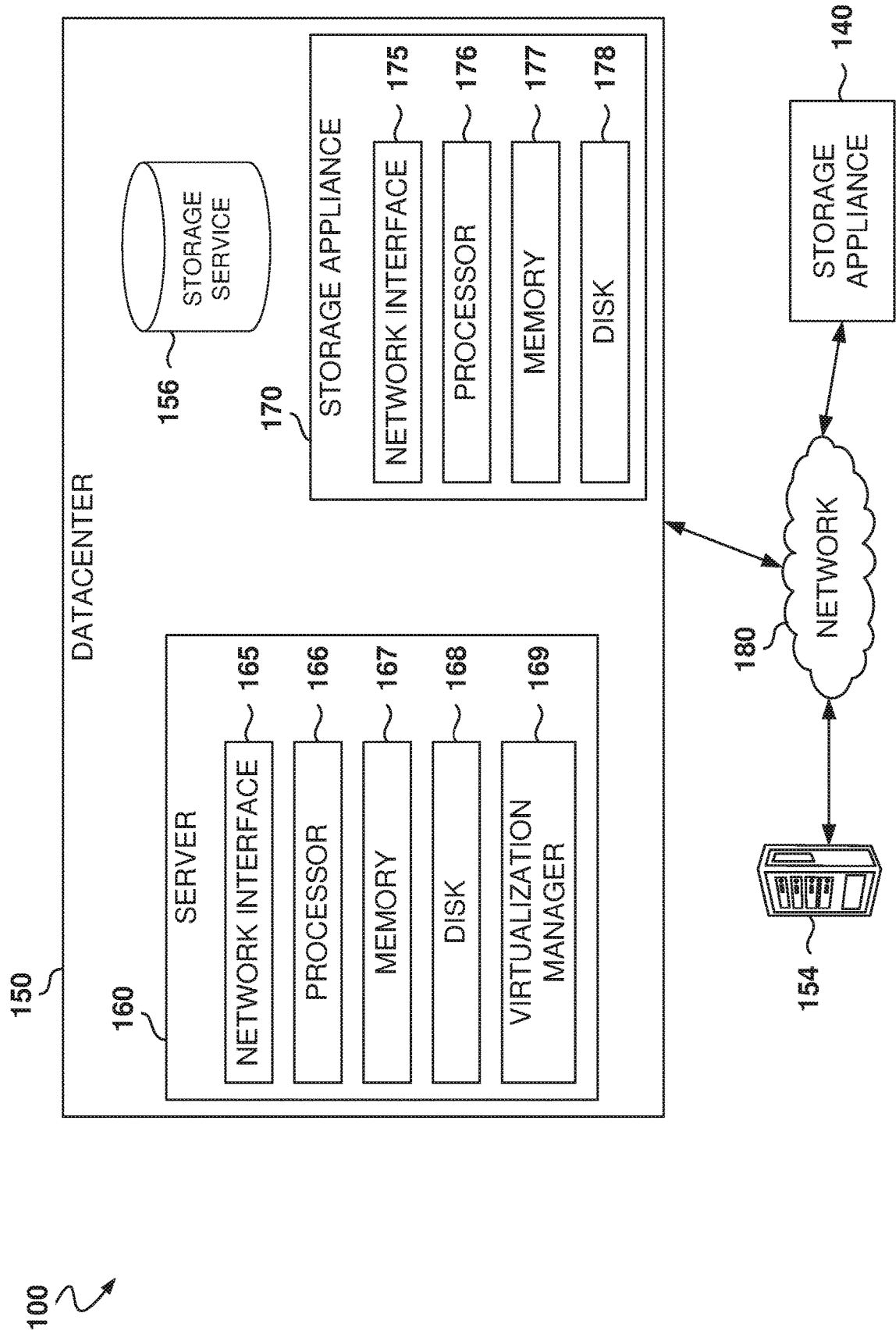
FIG. 1A is a block diagram illustrating an example networked computing environment in which some embodiments described herein are practiced.

FIG. 1A is a block diagram illustrating one embodiment of a networked computing environment 100 in which some embodiments are practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network (SAN) storage device, a NAS, a hard disk drive (HDD), a solid-state drive (SSD), or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure. The one or more virtual machines may run various applications, such as a cloud-based service, a database application or a web server. The storage device 156 may include one or more hardware storage devices for storing data, such as a HDD, a magnetic tape drive, a SSD, a SAN storage device, or a NAS device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., SSDs and HDDs) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167. Processor 166 may include one or more processing units or processing devices, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business-related applications to a computing device, such as computing device 154. The storage appliance 140 may comprise a cloud-based data management (CDM) system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours, for example.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface (GUI)) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

In some embodiments, the management system provides management of one or more clusters of nodes as described herein, such as management of one or more policies with respect to the one or more clusters of nodes. The management system can serve as a cluster manager for one or more clusters of nodes (e.g., present in the networked computing environment 100). According to various embodiments, the management system provides for central management of policies (e.g., Service Level Agreements (SLAs)) that remotely manages and synchronizes policy definitions with clusters of nodes.

An SLA defines protection levels for workloads, availability targets, and objects that are backed up. The SLA defines snapshot protection and retention, replication of data, and archival to protect and manage the data lifecycle. SLA domains can be aligned with the user's own SLAs to make compliance simple. For example, an SLA may define to back up a directory with a defined frequency, retain the data for a number for days, and take a full backup every week and keep for a year.

For some embodiments, the management system facilitates automatic setup of secure communications channels between clusters of nodes to facilitate replication of data. Additionally, for some embodiments, the management system manages archival settings for one or more clusters of nodes with respect to cloud-based data storage resource provided by one or more cloud service provider.

Figure 1B:
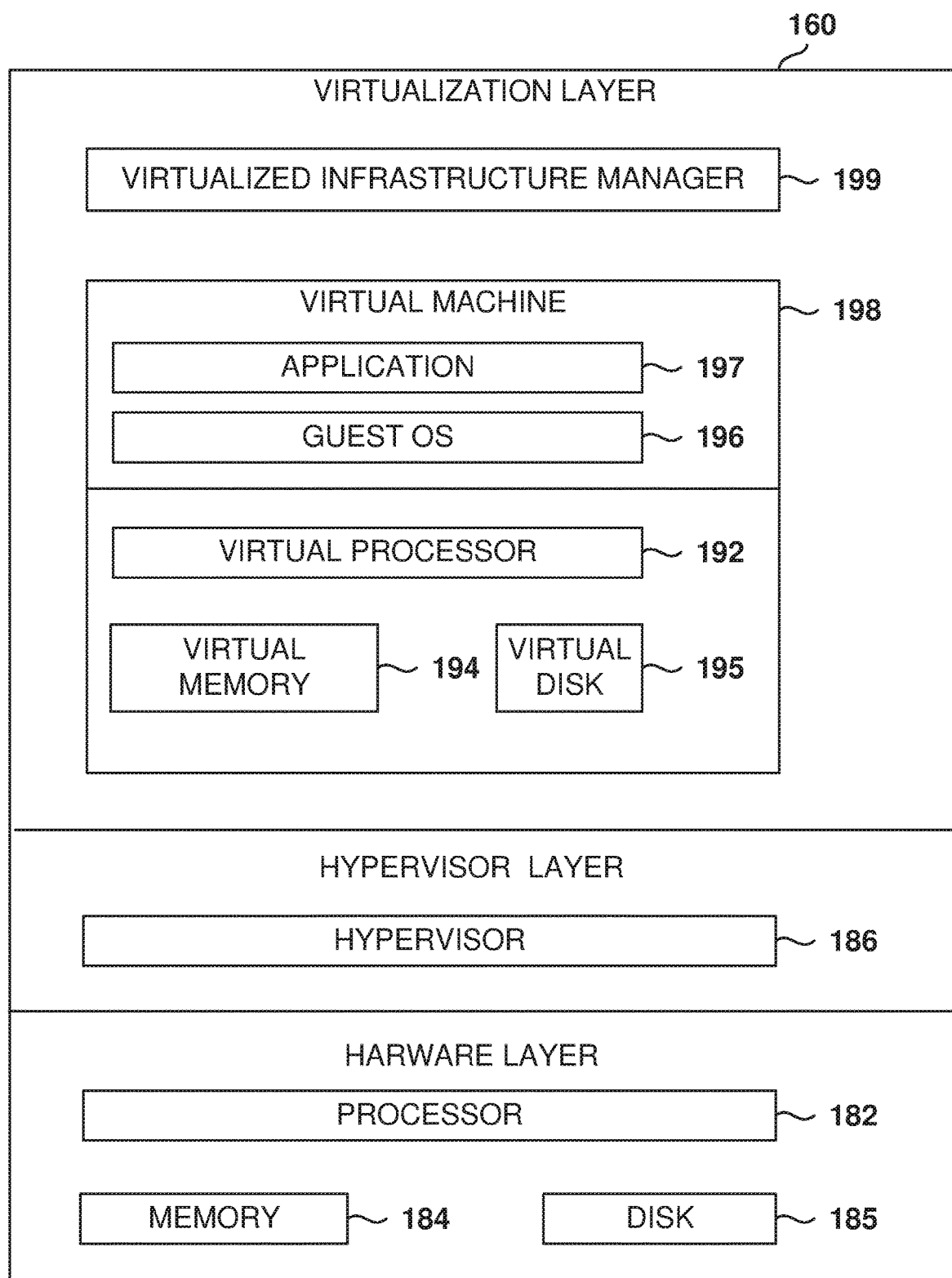
FIG. 1B is a block diagram illustrating one embodiment of a server in the example networked computing environment of FIG. 1A.

FIG. 1B is a block diagram illustrating one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 5:30 p.m. on Jun. 29, 2024) and a second snapshot of the virtual machine may correspond with a second state of the virtual machine at a second point in time subsequent to the first point in time (e.g., 5:30 p.m. on Jun. 30, 2024).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1A or storage appliance 170 in FIG. 1A, using a distributed file system protocol such as NFS. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
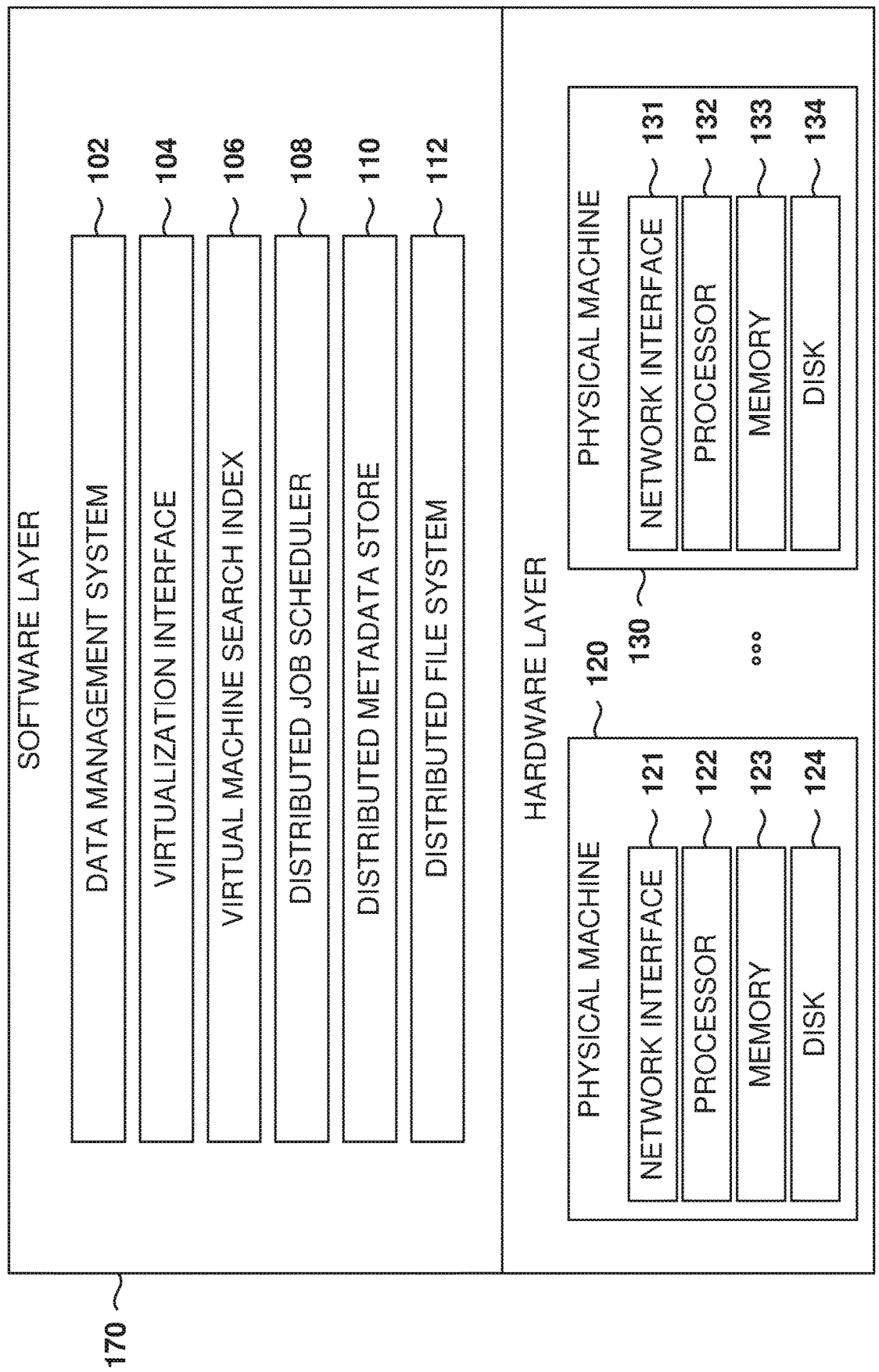
FIG. 1C is a block diagram illustrating one embodiment of a storage appliance in the example networked computing environment of FIG. 1A.

FIG. 1C is a block diagram illustrating one embodiment of storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a HDD and/or a SDD. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a HDD and/or a SDD. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 11B may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of floating IP addresses available within the cluster. In the event that the first node associated with the first floating IP address fails, one of the VRRP daemons may automatically assume or pick up the first floating TIP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node(j) may be (j−1) modulo N. In another example, given a number (N) of nodes in a cluster from node(0) to node(N−1), for a floating IP address (i), the VRRP priority of node(j) may be (i−j) modulo N. In these cases, node(j) will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system (DFS) 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file.

In some embodiments, the data management system 102 resides inside the distributed file system 112. The data management system 102 may receive requests to capture snapshots of the entire distributed file system 112 on a periodic basis based on internal protocols or upon occurrence of user triggered events.

The files stored within the distributed file system 112 may be replicated or mirrored over a plurality of physical machines, thereby creating a load-balanced and fault tolerant distributed file system. In one example, storage appliance 170 may include ten physical machines arranged as a failover cluster, and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster. In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager that the virtual machine the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2024), and a file path to where the first chunk is stored within the distributed file system 112 (e.g., the first chunk is located at /snapshots/VM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance that manages and stores one or more snapshots of a virtual machine. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine, and/or manage operations in online data format conversion during file transfer to a remote location, for example. More specific operations in example data format conversion techniques are discussed further below.

Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
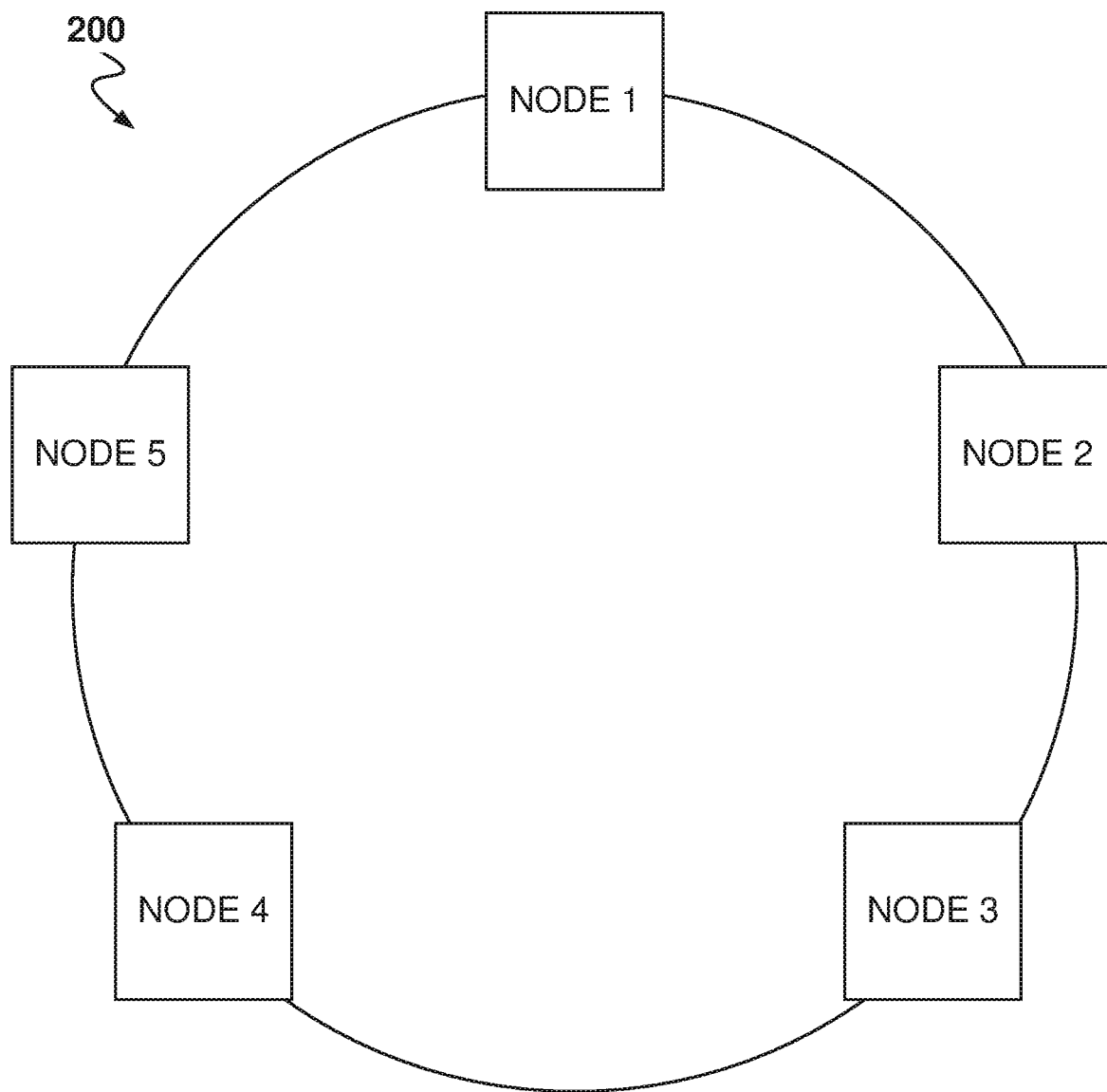
FIG. 2 is a block diagram illustrating an example cluster of a distributed decentralized database, according to some example embodiments.

FIG. 2 is a block diagram illustrating an example cluster 200 of a distributed decentralized database, according to some example embodiments. As illustrated, the example cluster 200 includes five nodes, nodes 1-5. In some example embodiments, each of the five nodes runs from different machines, such as physical machine 130 in FIG. 1C or virtual machine 198 in FIG. 1B. The nodes in the example cluster 200 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the example cluster 200 in shards or chunks and decentralized in that there is no central storage device and no single point of failure. The system operates under an assumption that multiple nodes may go down, up, become non-responsive, and so on. Sharding is splitting up of the data horizontally and managing each shard separately on different nodes. For example, if the data managed by the example cluster 200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 200. For example, data written to node 1 can be replicated to nodes 2 and 3. If node 1 prematurely terminates, node 2 and/or 3 can be used to provide the replicated data. In some example embodiments, each node of example cluster 200 frequently exchanges state information about itself and other nodes across the example cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the example cluster 200.

Reading: Any node of example cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of example cluster 200 are configured to function the same way (e.g., as symmetrical peer database nodes that communicate via gossip protocol, such as Cassandra nodes) with no single point of failure. If one of the nodes in example cluster 200 terminates prematurely ("goes down"), another node can rapidly take the place of the terminated node without disrupting service. The example cluster 200 can be a container for a keyspace, which is a container for data in the distributed decentralized database system (e.g., whereas a database is a container for containers in conventional relational databases, the Cassandra keyspace is a container for a Cassandra database system).

Figure 3:
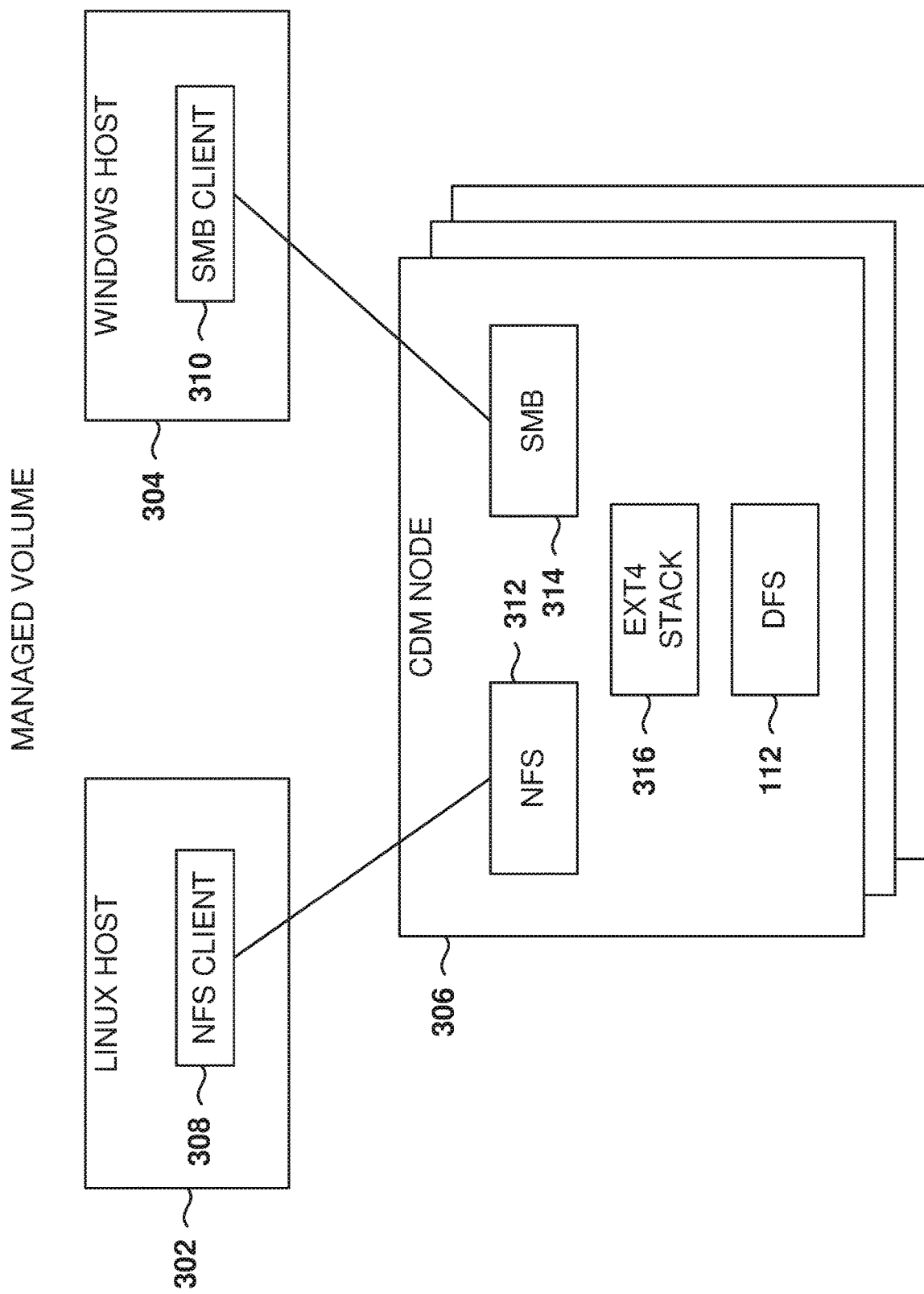
FIG. 3 illustrates the architecture of a system implementing managed volumes, according to some example environments.

FIG. 3 illustrates the architecture of a system implementing managed volumes, according to some example environments. Managed Volumes provide hosts with a backup target location on a CDM cluster. The CDM cluster manages snapshots of the backup data from a host that is backed up using a managed volume (MV) through the policies of a specified SLA domain.

The managed volume provides a mechanism for backing up any type of data. For example, an MV acts as an external hard drive, where the host can copy data to the external drive and the data will be persisted.

A CDM node 306 stores data from the hosts, such as Linux host 302 and Windows host 304. Although some embodiments are described with reference to Linux and Windows hosts, the same principles may be applied to any type of host and operating environment.

In the Linux host 302, an NFS client 308 provides a backup path to the NFS module 312 in the CDM node 306. To back up data, the Linux host 302 writes to the NFS client 308, which forwards the data to the CDM node 306 over the network. For the Windows host 304, a Server Message Block (SMB) client 310 provides the backup path to the SMB module 314 in the CDM node 306.

At the CDM node 306, an Ext4 stack 316 provides a path to the DFS 112 for the NFS module 312 and SMB module 314. Ext4 is a file system for Linux and is exposed to the NFS and SMB modules for writing data. Ext4 provides file system benefits, such as creating a directory structure for storing data and Ext4 is backed by the CDM distributed file system. Internally, on the CDM, the data is stored and managed into the distributed file system. To the end user, Ext4 appears as a directory where the data is stored.

To add a managed volume, a user with administrator privileges accesses the CDM User Interface (UI) and selects the option to add the managed volume. The UI then presents a dialog page for entering the managed-volume parameters, such as volume name, amount of storage, and the communications protocol to be used by the host. Other optional parameters include an application tag, an TIP address, an FQDN, subnet parameters (only hosts in the subnet can access the managed volume), and the number of channels from the host to CDM. After the user configures the managed volume, the user then selects the option to add the managed volume, and the CDM creates the managed volume.

Figure 4:
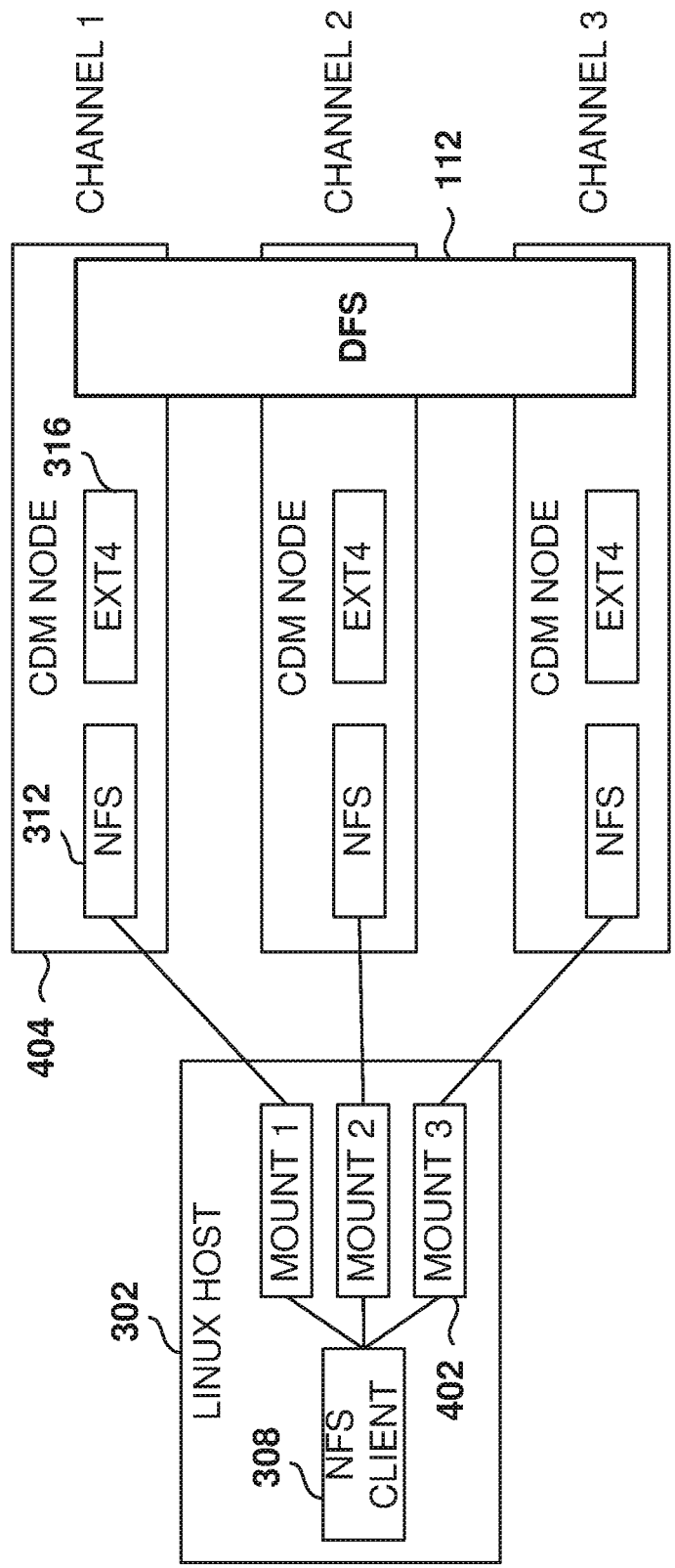
FIG. 4 illustrates the implementation of multiple channels for backing up data to a Distributed File System (DFS), according to some example environments.

FIG. 4 illustrates the implementation of multiple channels for backing up data to a Distributed File System (DFS), according to some example environments. To increase the bandwidth for backing up data, multiple channels may be used, where each channel provides a path for storing data on CDM. Each channel is independent from each other and the channels may backup data to different CDM nodes 404. The CDM nodes 404 share the same DFS 112.

In the illustrated example, three channels are used for backing up data from the Linux host 302, and each channel sends data to a different CDM node, but other implementations may have two channels backing up data to the same CDM node 404. At the Linux host 302, an endpoint 402 is mounted for each channel, and the NFS client 308 distributes the backup data to the different endpoints. Although the example is presented with reference to a Linux host 302, the same principle may be used for other types of hosts.

Having multiple channels may greatly improve performance for backing up data. For example, Oracle databases can do multiple screen backups, which generate multiple streams of data that can be backed up in parallel. By using channel, the Oracle databases can be backed up faster and more efficiently.

Each channel appears as the NFS module 312 coupled to the Ext4 stack 316. The Linux host 302 sees a mounted directory where data can be stored. In some example environments, each channel is associated with an IP addresses, which are floating IP addresses as the IP address for each channel may change over time. This allows the backup system to manage the active channels in case a CDM node 404 fails, becomes congested, or is taken down.

After the floating IP addresses are configured, the CDM cluster assigns each node a floating IP address. The nodes handle communication through the assigned floating IP address. When a node cannot handle communication on its assigned floating IP address, CDM assigns that address to another node. This functionality maintains the availability of the managed volumes.

In some example embodiments, an Application Programming Interface (API) is used to access and manage the endpoints 402. When a customer has to backup data, the customer can use a cron job, which calls a begin-snapshot operation on the MV, writes the data into the mount point, and then makes an end-snapshot call.

When the user has the responsibility to back up the data, the volumes have to be always available on the cluster, which limits the number of MVs per cluster as the volumes have to always be available, although most volumes may be idle at a point in time. Additionally, since the user controls when to back up the data, the user is responsible for maintaining SLAs.

Figure 5:
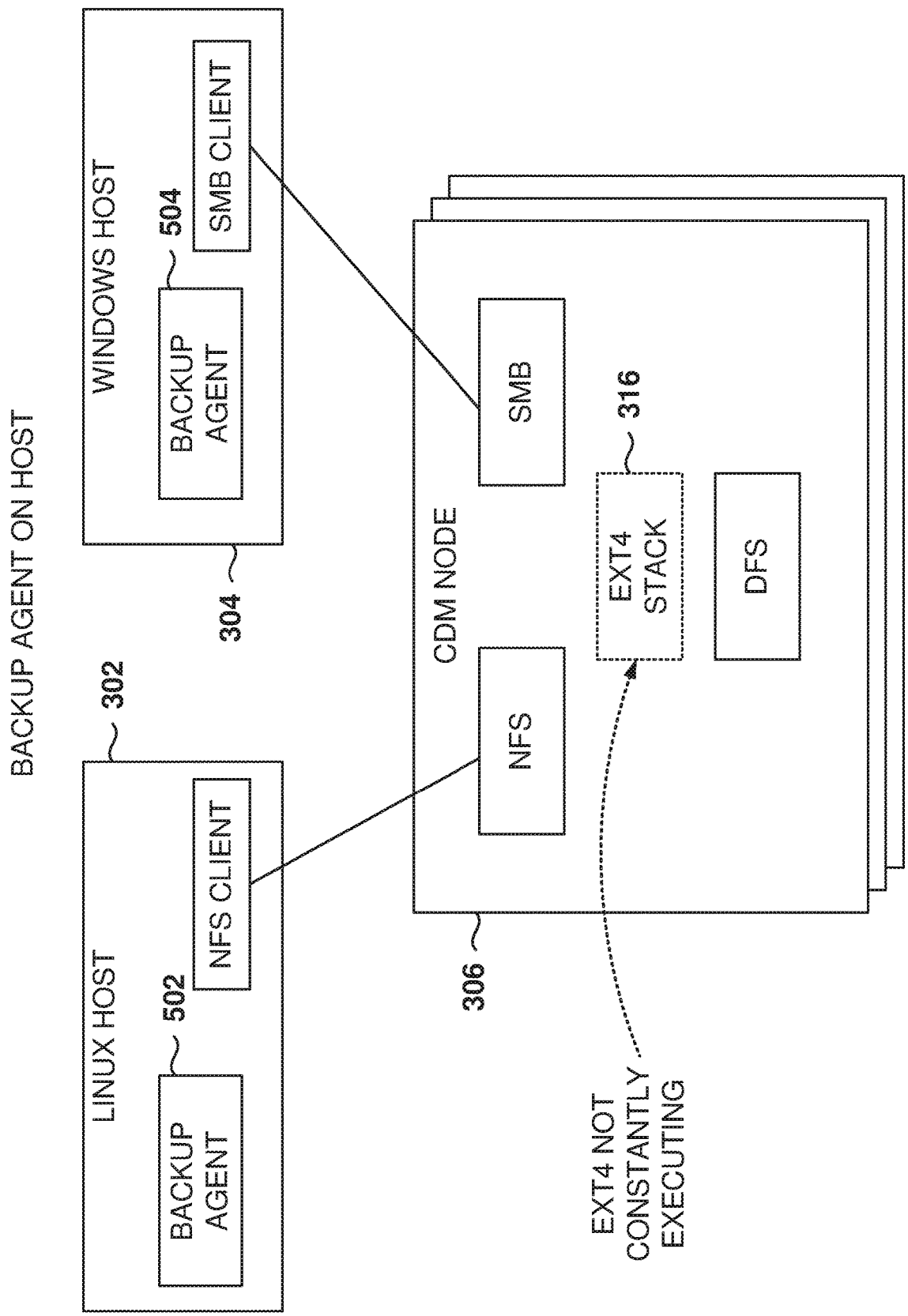
FIG. 5 illustrates an architecture that includes the installation of a backup agent at a host, according to some example embodiments.

FIG. 5 illustrates an architecture that includes the installation of a backup agent at a host, according to some example embodiments. In some example embodiments, a backup agent (BA) 502, 504 is installed in the host to be backed up. The BA 502, 504 is in communication with CDM, controlled by the CDM, and executes commands in the host for performing backups.

The BA 502 initiates backup operations, mounts MVs, writes data, and unmounts the MVs. The BA 502 allows the CDM to provided SLAs for backup services, since the backup of the data is now controlled by the CDM instead of the user.

With SLA MVs, the customers do not have to initiate and end the writing of snapshots. Users are able to create MVs that are associated with SLAs configured in the CDM system, including the scheduling of backups and policy retentions for the backups. The customer provides a backup script (e.g., write data to a certain directory) which will run the commands to back up their specific objects. The orchestration of the backup according to the SLA associated to the MV and the mount management is controlled by the CDM. The MVs are brought up on demand on the cluster when an ingest on an SLA MV is supposed to be scheduled, and the MVs are torn down once the data is ingested and a snapshot is taken. This enables supporting a large number of SLA MVs on the cluster compared to the number of conventional volumes when the volumes are permanently mounted.

CDM can now backup data with the frequency defined by the SLA and having the backup agent 502 writing the data at the appropriate times, without requiring user intervention. Further, CDM handles the back up operations, such as recovery when a backup operation fails (e.g., taking the data to the last correct snapshot). Also, CDM can handle retry operations when the backup operation fails. Additionally, the user can manage the state of their backups in the tools provided by CDM, which also allows the client to initiate backup and restore operations on demand. Further, since CDM controls backups for many hosts, CDM is able to do load balancing and prioritize operations based on operational parameters and SLAs.

For example, CDM may instruct the backup agent to mount four directories, run a script to backup data, check the status of the script, and unmount the directories after the script to write the data ends. Another example is for backing up databases on the host, and the BA 502 will execute the scripts that provide the controls for interfacing with the databases.

The use of scripts makes it possible to backup up any type of data at the host and gives clients the flexibility to write the data and interface with applications and databases executing on their hosts. The script could be a simple write-directory command, or a more complex script that queries an application to download application data and then backing up the application data.

Since CDM knows when the MVs are needed, the MVs can be mounted on demand, and the corresponding Ext4 stack 316 can also be brought up and down at the CDM node on demand. That is, Ext4 stack 316 is not constantly executing, and is brought up when the MVs are mounted. This frees up resources at the CDM node, and the CDM node is able to support a larger number of hosts.

Figure 6:
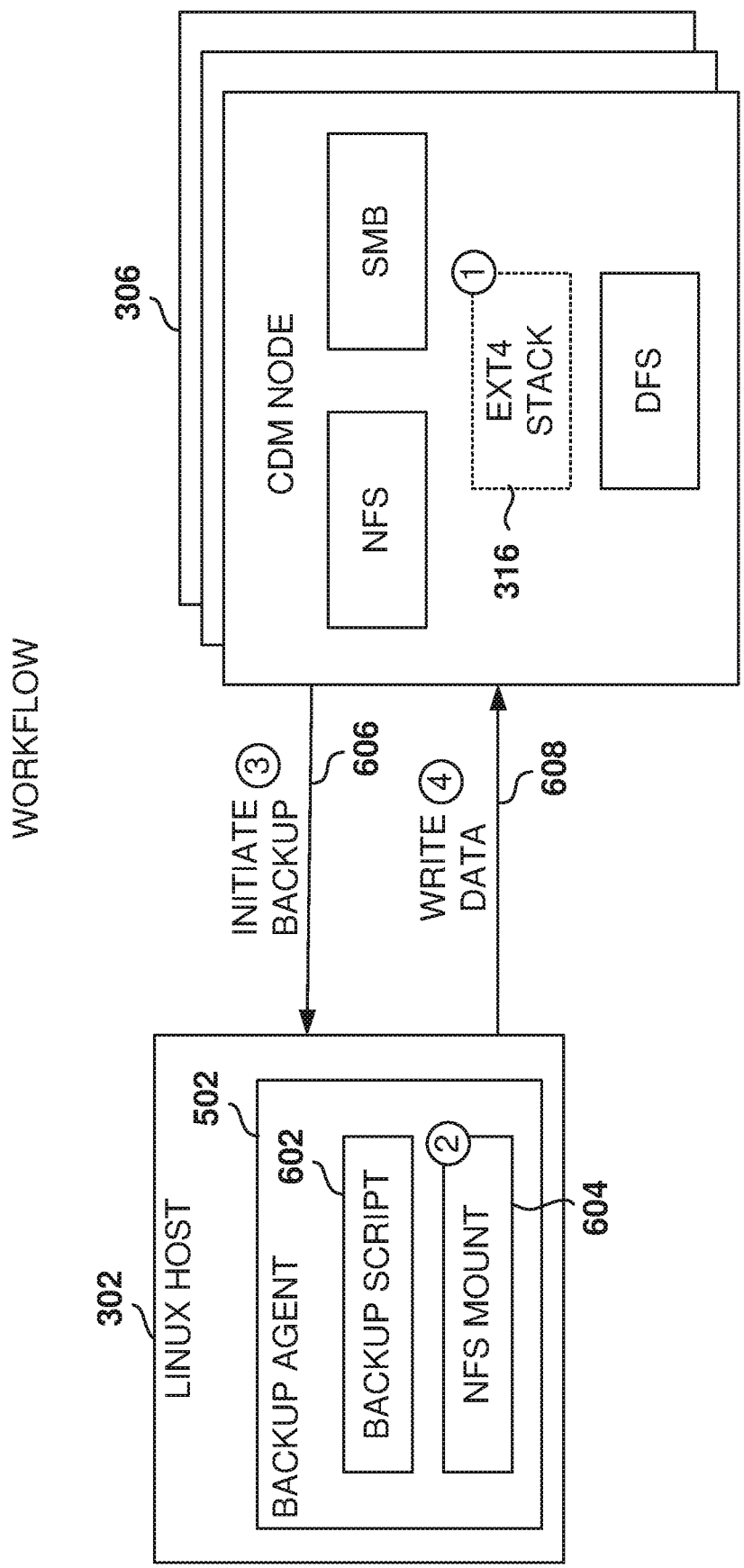
FIGS. 6-7 illustrate the workflow for backing up data on a Cloud Data Management (CDM) node, according to some example embodiments.
Figure 7:
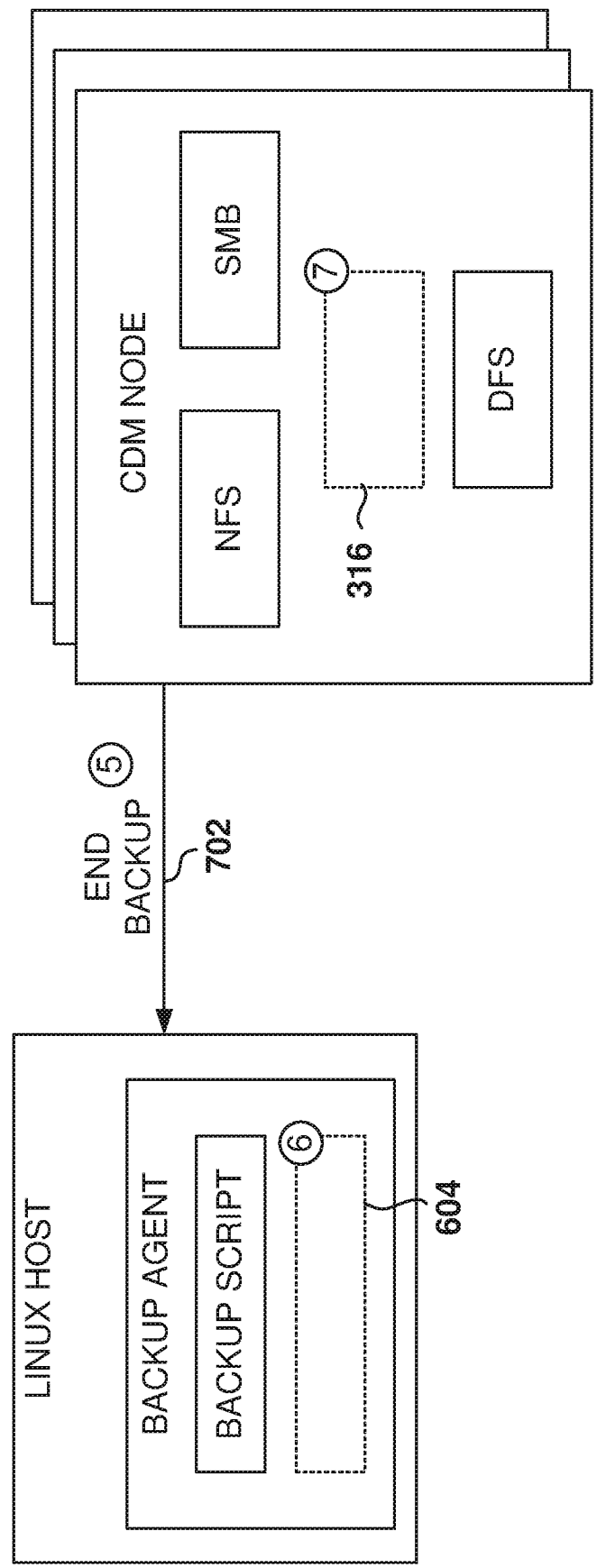

FIGS. 6-7 illustrate the workflow for backing up data on a CDM node 306, according to some example embodiments. In some example embodiments, the CDM executes a job that manages the complete backup process. Initially, the Ext4 stack 316 does not exist for the Linux host 302, and when the CDM 306 determines, based on the customer SLA, to back up data, the CDM creates the Ext4 stack 316.

In some example embodiments, a load-balancing algorithm determines which CDM nodes will bring the channels requested. Load balancing allows the CDM system to better plan to meet the SLAs defined for all hosts. Also, CDM may increase the number of nodes if the system becomes congested.

In some example embodiments, the load-balancing algorithm distribute the load across the CDM nodes to guarantee the following: an equitable distribution of the channels across the CDM nodes, impose an upper limit on the number of channels per node, impose an upper limit on the number of concurrent backups at a given node, avoid starvation by any of the MVs in the system, and stop long-running backup jobs from starving smaller backup jobs.

The CDM sends a request to the BA 502 to mount the MV (Network File System (NFS) mount 604) and makes the corresponding MV writable (otherwise the state is read only). The BA 502 mounts the endpoint NFS mount 604 and makes it available for the backup script 602.

After the MV is mounted, the CDM node 306 sends a command 606 to the BA 502 to initiate the backup. The BA 502 runs the backup script 602 that writes the data 608 to the CDM node 306.

FIG. 7 illustrates additional operations in the backup process. After the backup script 602 ends, the BA 502 notifies the CDM node, and the CDM nodes validates the received data and that the received data is persisted in the DFS. Afterwards, the CDM nodes sends a command 702 to the BA 502 to end the backup operation.

The BA 502 unmounts the NFS mount 604 and the CDM node 306 will terminate the Ext4 stack 316. Further, the CDM node 306 marks the associated MV as read only.

In some experiments, by freeing resources at the CDM node 306, the CDM system is able to handle four times the number of volumes with respect to other implementations that keep the volumes always available to all the hosts.

MVs provide techniques for backing up any application for which there is no dedicated backup solution. For example, MVs may be used as a backup repository to store the backups of Oracle, Db2, SAP, Postgres, MySQL, and other databases. Further, MVs may be used to back up hypervisors and virtual machines. For example, Red Hat Virtualization images, OpenStack, and KVM virtualization images. Further yet, MVs may be used to back up mainframe applications.

The customer can write their own scripts, a simple process that is normal practice. After that, the customer configures the CDM with a simple user interface, and CDM handles all backup-related operations to support SLAs, e.g., scheduling, full and incremental backups, data restores, deletion of backups. Further, CDM ensures that backups are consistent in the case of failures, by restoring to the last known successful backup. This way, snapshots of the data are consistent and accurate. In some cases, default scripts may be provided to the user for backing up data in predefined situations, e.g., backup up a directory.

For example, for an Oracle database, the CDM cluster recognizes an Oracle database as a data source. Oracle databases can be protected using MVs by integrating with the Oracle Recovery Manager (RMAN). RMAN merged incremental backups, launched from the Oracle host, write data to the Managed Volume. For each protected database, the CDM cluster hosts a MV with one or more channels. The CDM cluster exports the channels, and the channels are mounted on the Oracle database host. The Oracle database backup files on the MV remain available during the RMAN retention period. Further, RMAN may add and remove files from the MV based on the settings used for the incremental merge backup. The snapshots managed by the CDM cluster enable the restoration of backups from outside the RMAN retention period. Further, Direct NFS may be enabled on any Oracle host that mounts the exported channels of a MV. Available in Oracle 11g and newer, Direct NFS (dNFS) runs in the database kernel and provides an optimized NFS client. The dNFS client uses less memory, provides faster performance, and automatically balances load across available channels.

In one example, a merged incremental backup may use an RMAN command block as follows:
RUN
{RECOVER COPY OF DATABASE WITH TAG
'incr_update' UNTIL TIME 'SYSDATE-7';
BACKUP INCREMENTAL LEVEL 1 FOR RECOVER
  OF COPY WITH TAG
'incr_update' DATABASE;}

Figure 8:
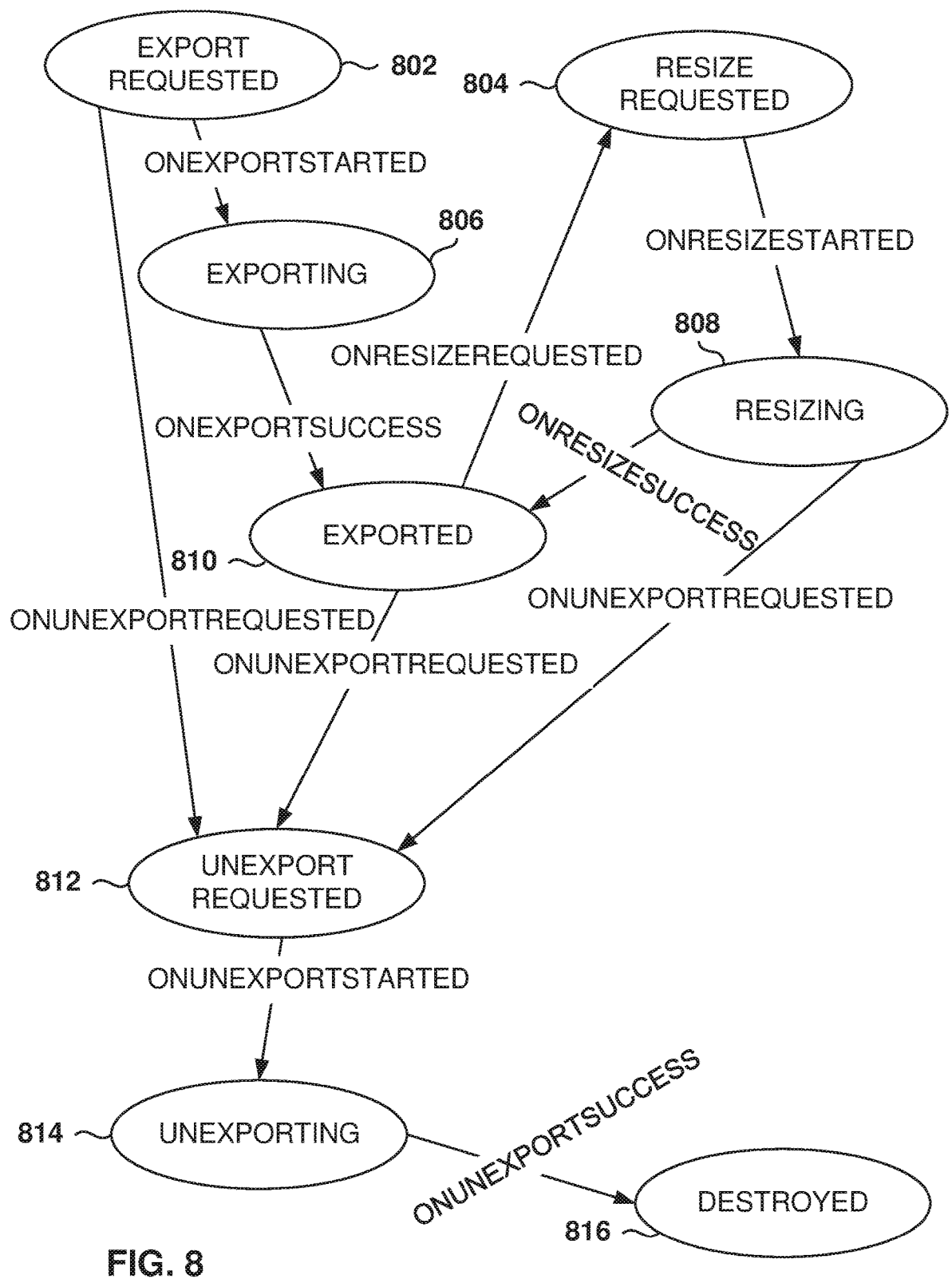
FIG. 8 is a state diagram for the CDM, according to some example embodiments.

FIG. 8 is a state diagram for the CDM, according to some example embodiments. FIG. 8 shows the life cycle of an SLA managed volume. When a customer makes a request to create an SLA MV (e.g., an API call to create the MV), the MV goes in the export-requested state 802. As used herein, export refers to the creation of the MV. Thus, the export-requested state means that a user has requested the creation of a new MV.

Once the CDM starts processing the request, the process transitions to the exporting state 806, and the CDM prepares the MV. After the CDM completes the creation of the MV, the process transitions to the exported state 810, and the exported state 810 means that the SLA MV has been created and now CDM is ready for backing up data. Backup operations are performed while the process is at the exported state 810.

When a client determines that the capacity of the MV is being exhausted, the client submits a resize request, which causes the state to change to resize-requested state 804. When the CDM receives the resize request, the state changes to resizing state 808 while the CDM works on adding (or subtracting) space for the MV. Once the CDM finishes successfully with the resize operation, the process goes back to the exported state 810. In some example embodiments, backing up data is not allowed while in the resizing state 808 to avoid inconsistencies.

During the resizing state 808, the CDM brings down the MV and recreates the MV with a larger (or smaller) size and makes the corresponding configuration changes in the CDM data structures and DFS.

When the user decides that the MV is not needed any longer, that is, that the MV is to be deleted, the user can generate an unexport request, which means that the MV is to be deleted. The process transitions to the unexport-requested state 812 in response to the user request, which may be originated at a user interface provided by CDM. The transition to the unexport-requested state 812 may be performed at any state, such as at the initial export-requested state 802, at the exported state 810, or at the resizing state 808.

After receiving the unexport request, the process flows to the unexporting state 814 where the CDM performs the activities related to the deletion of the volume, including deleting the data from the DFS. Once the CDM finishes with the deletion of the MV, the process moves to the destroyed state 816, which means that the MV does no longer exist.

Figure 9:
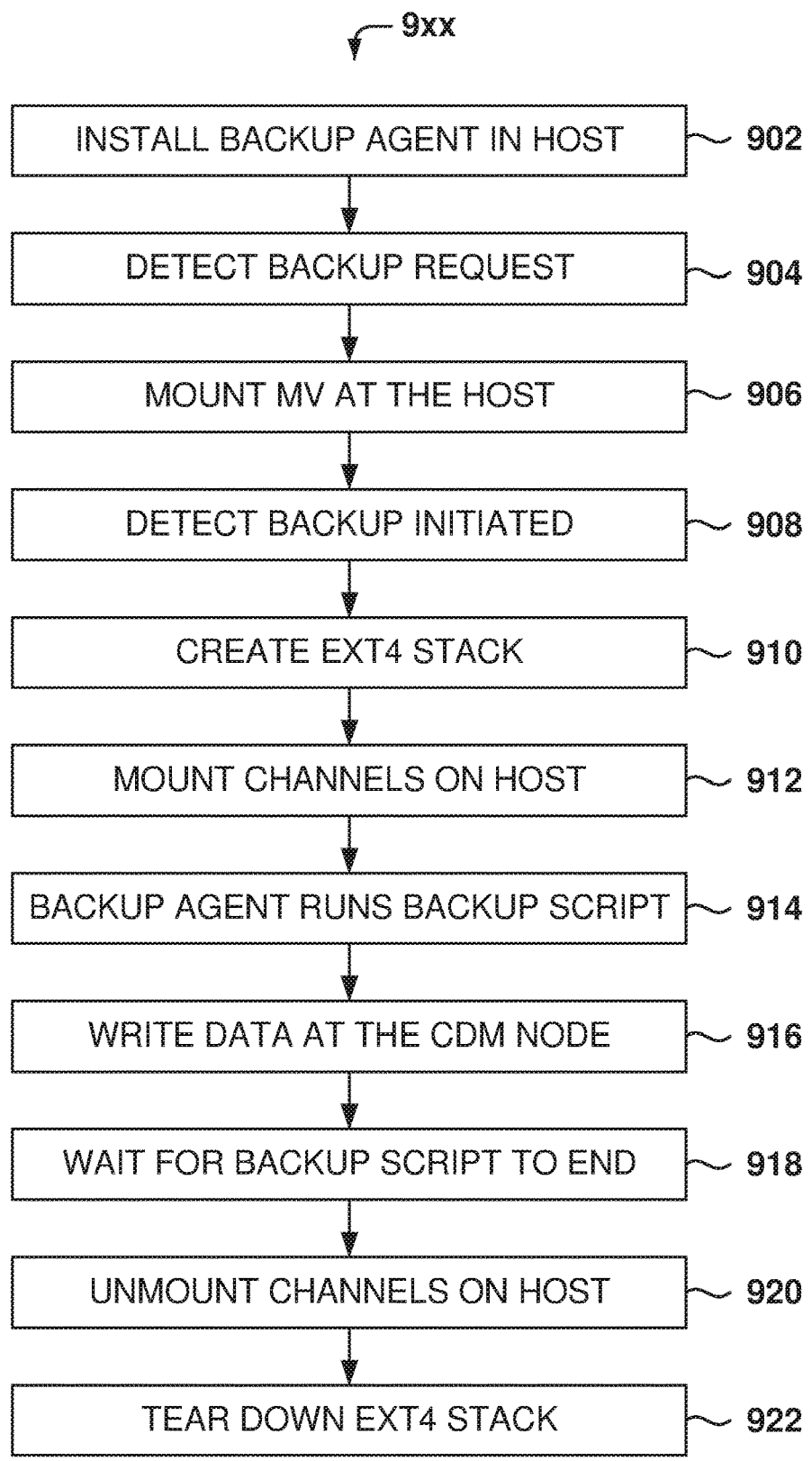
FIG. 9 is a flowchart of a method for setting up and backing up data on the CDM, according to some example embodiments.

FIG. 9 is a flowchart of a method for setting up and backing up data on the CDM, according to some example embodiments. While the various operations in this flowchart are presented and described sequentially, one of ordinary skill will appreciate that some or all of the operations may be executed in a different order, be combined or omitted, or be executed in parallel.

The backup agent is installed in the host at operation 902. The backup agent is custom for each type of application and/or operating system, and the backup agent interacts with the CDM cluster to coordinate backup operations. After the backup agent is installed, the host is registered with CDM as a managed host. Once the host is registered, the backup agent can be used to create managed volumes.

In some example embodiments, an API is provided for MV operations, such as create MV, begin backup, write data, end backup, resize MV, and destroy MV.

From operation 902, the method flows to operation 904 where a request for backup is detected. The request may originate from a user, or from a CDM node to satisfy an SLA (e.g., capture a full backup of a certain directory weekly).

At operation 906, a MV is mounted at the host. At operation 908, CDM detects that the backup has initiated and, at operation 910, creates the Ext4 stack at the CDM node. Further, at operation 912, an endpoint is mounted at the host (e.g., NFS mount 604 in FIG. 6).

At operation 914, the backup agent runs the backup script to write data to the CDM node via the endpoint, and the CDM node writes the data in DFS at operation 916. Operations 914 and 916 may repeat several cycles and run concurrently.

After the script ends execution and all the data has been transferred to the CDM node, at operation 918, the CDM waits for the back script to end. In response, the backup agent unmounts the channel on the host at operation 9120.

Further, at operation 922, the CDM tears down (e.g., terminates) the Ext4 stack, thus, freeing resources available for other backup operations.

Figure 10:
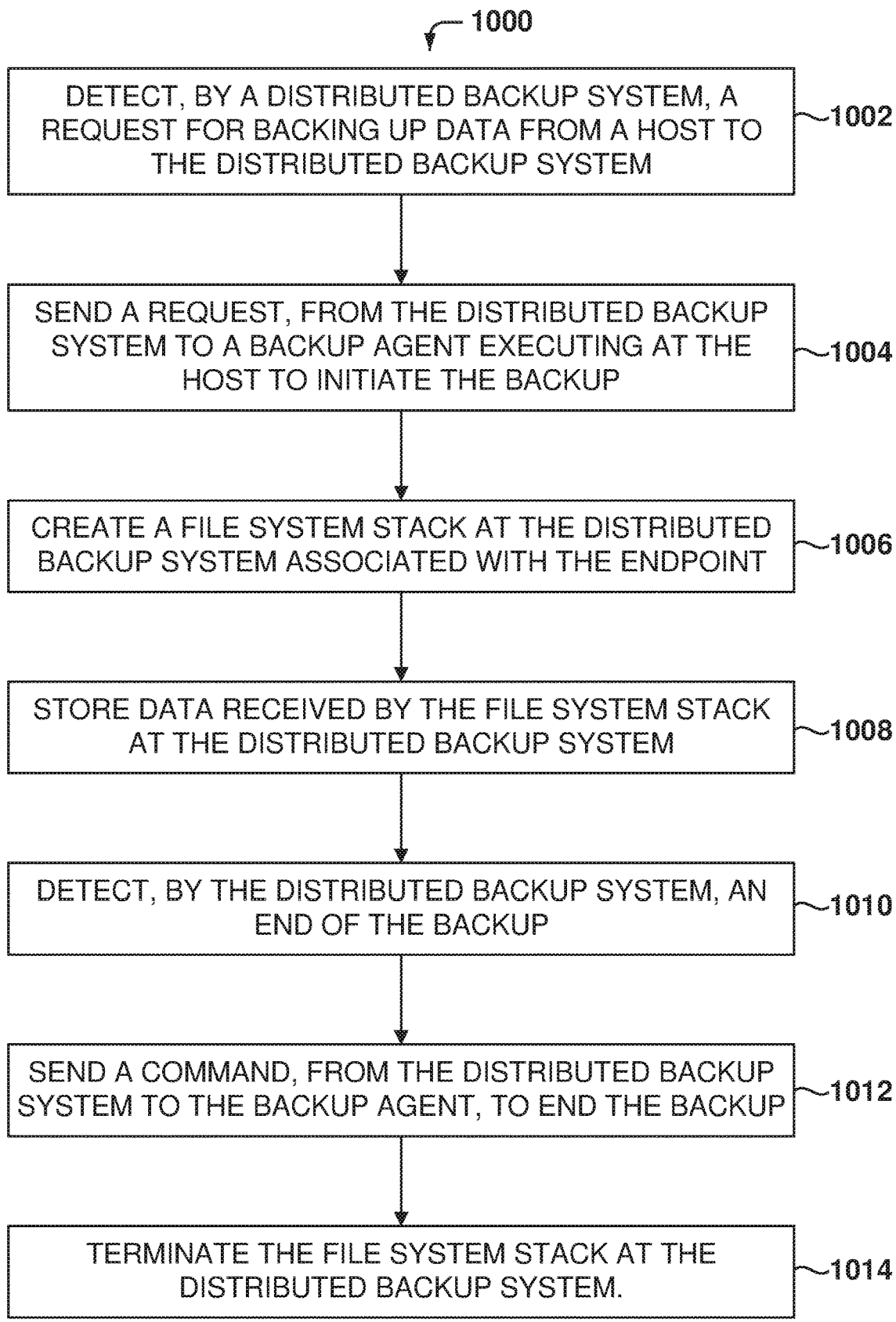
FIG. 10 is a flowchart of a method for backing up data to a distributed multichannel storage system.

FIG. 10 is a flowchart of a method 1000 for backing up data to a distributed multichannel storage system. While the various operations in this flowchart are presented and described sequentially, one of ordinary skill will appreciate that some or all of the operations may be executed in a different order, be combined or omitted, or be executed in parallel.

Operation 1002 is for detecting, by a distributed backup system, a request for backing up data from a host to the distributed backup system.

From operation 1002, the method 1000 flows to operation 1004 to send a request, from the distributed backup system to a backup agent executing at the host to initiate the backup. The backup agent mounts an endpoint for writing to the distributed backup system and executes a script that writes the data for the backup to the endpoint.

From operation 1002, the method 1000 flows to operation 1004 for creating a file system stack at the distributed backup system associated with the endpoint.

From operation 1004, the method 1000 flows to operation 1006 to store data received by the file system stack at the distributed backup system.

From operation 1006, the method 1000 flows to operation 1008 where the distributed backup system sends a command to the backup agent to end the backup.

From operation 1008, the method 1000 flows to operation 1010 for terminating the file system stack at the distributed backup system.

In one example, the method 1000 further comprises, in response to the command to end the backup, unmounting the endpoint by the backup agent.

In one example, the distributed backup system comprises a plurality of nodes, where the file system stack is created at one from the plurality of nodes, and an internet protocol (IP) address of the node with the file system stack is provided to the backup agent.

In one example, the method 1000 further comprises providing a plurality of channels for backing up data from the host to the plurality of nodes.

In one example, the method 1000 further comprises providing a plurality of endpoints at the distributed backup system, the plurality of endpoints being in communication with the file system stack for backing up data.

In one example, the plurality of endpoints comprises a network file system (NFS) endpoint and a Server Message Block (SMB) endpoint.

In one example, the request for backing up data is generated by the distributed backup system based on a service level agreement (SLA).

In one example, the SLA defines one or more of frequency of full backups, frequency of incremental backups, and amount of time to retain the backups.

In one example, the availability of a managed volume for backing up the data comprises a plurality of states comprising export requested, exported, resize requested, unexport requested, and destroyed.

In one example, the method 1000 further comprises initializing parameters of the backup agent when the backing up of data is initially configured by the distributed backup system, the parameters comprising an IP address of a node for backing up the data, type of endpoint, and the script to be executed for backing up data.

Another general aspect is for a system that includes a memory comprising instructions and one or more computer processors. The instructions, when executed by the one or more computer processors, cause the one or more computer processors to perform operations comprising: detecting, by a distributed backup system, a request for backing up data from a host to the distributed backup system; sending a request, from the distributed backup system to a backup agent executing at the host to initiate the backup, wherein the backup agent mounts an endpoint for writing to the distributed backup system and executes a script that writes the data for the backup to the endpoint; creating a file system stack at the distributed backup system associated with the endpoint; storing data received by the file system stack at the distributed backup system; detecting, by the distributed backup system, an end of the backup; sending a command, from the distributed backup system to the backup agent, to end the backup; and terminating the file system stack at the distributed backup system.

In yet another general aspect, a machine-readable storage medium (e.g., a non-transitory storage medium) includes instructions that, when executed by a machine, cause the machine to perform operations comprising: detecting, by a distributed backup system, a request for backing up data from a host to the distributed backup system; sending a request, from the distributed backup system to a backup agent executing at the host to initiate the backup, wherein the backup agent mounts an endpoint for writing to the distributed backup system and executes a script that writes the data for the backup to the endpoint; creating a file system stack at the distributed backup system associated with the endpoint; storing data received by the file system stack at the distributed backup system; detecting, by the distributed backup system, an end of the backup; sending a command, from the distributed backup system to the backup agent, to end the backup; and terminating the file system stack at the distributed backup system.

Figure 11:
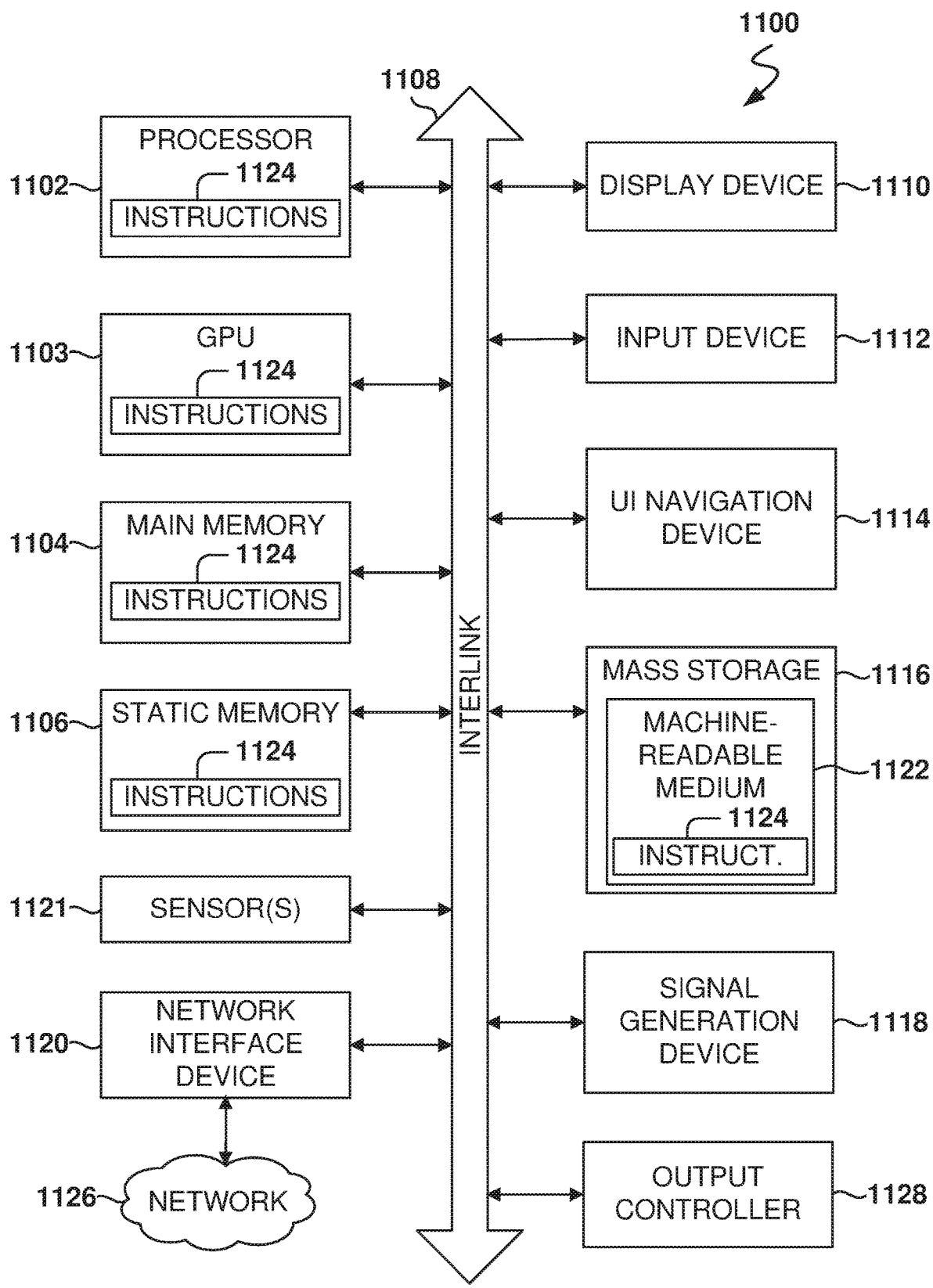
FIG. 11 is a block diagram illustrating an example of a machine upon or by which one or more example process embodiments described herein may be implemented or controlled.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a hardware processor core, or any combination thereof), a graphics processing unit (GPU) 1103, a main memory 1104, and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, or another sensor. The machine 1100 may include an output controller 1128, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100. In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium, or multiple media, (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    detecting, by a distributed backup system, a request for backing up data from a host to the distributed backup system;
    sending a request, from the distributed backup system to a backup agent executing at the host, to initiate a backup, wherein, based on the request to initiate the backup, the backup agent:
        mounts a first network file share endpoint at the host for writing to the distributed backup system and executes a first script that writes a first portion of the data for the backup to the first network file share endpoint; and
        mounts a second network file share endpoint at the host for writing to the distributed backup system and executes a second script that writes a second portion of the data for backup to the second network file share endpoint;
    creating, based at least in part on sending the request to initiate the backup:
        a first file system stack at a first node of the distributed backup system that provides a first path to the first network file share endpoint at the host via a first network file share client at the distributed backup system, wherein the first network file share client is at the first node; and
        a second file system stack at a second node of the distributed backup system that provides a second path to the second network file share endpoint at the host via a second network file share client at the distributed backup system, wherein the second network file share client is at the second node,
    storing data received by the first file system stack and the second file system stack at the distributed backup system, wherein the first portion of the data for the backup is received by the first file system stack at the first node, and wherein the second portion of the data for the backup is received by the second file system stack at the second node;
    detecting, by the distributed backup system, an end of the backup;
    sending a command, in response to detecting the end of the backup and from the distributed backup system to the backup agent executing at the host, to end the backup; and
    terminating the first file system stack and the second file system stack at the distributed backup system in response to detecting the end of the backup.

2. The computer-implemented method as recited in claim 1, further comprising:
    in response to the command to end the backup, unmounting the first network file share endpoint by the backup agent.

3. The computer-implemented method as recited in claim 1, wherein the distributed backup system comprises a plurality of nodes, wherein the first file system stack is created at one node from the plurality of nodes, wherein an internet protocol (IP) address of the one node with the first file system stack is provided to the backup agent.

4. The computer-implemented method as recited in claim 3, further comprising:
    providing a plurality of channels for backing up data from the host to the plurality of nodes.

5. The computer-implemented method as recited in claim 1, further comprising:
    providing a plurality of endpoints at the distributed backup system, the plurality of endpoints being in communication with the first file system stack for backing up data.

6. The computer-implemented method as recited in claim 5, wherein the plurality of endpoints comprises the first network file share endpoint and a Server Message Block (SMB) endpoint.

7. The computer-implemented method as recited in claim 1, wherein the request for backing up data is generated by the distributed backup system based on a service level agreement (SLA).

8. The computer-implemented method as recited in claim 7, wherein the SLA defines one or more of frequency of full backups, frequency of incremental backups, and amount of time to retain the full backups and the incremental backups.

9. The computer-implemented method as recited in claim 1, wherein an availability of a managed volume for backing up the data comprises a plurality of states comprising export requested, exported, resize requested, unexport requested, and destroyed.

10. The computer-implemented method as recited in claim 1, further comprising:
    initializing parameters of the backup agent when backing up of data is initially configured by the distributed backup system, the parameters comprising an IP address of a node for backing up the data, type of endpoint, and the first script to be executed for backing up data.

11. The computer-implemented method as recited in claim 1, further comprising:
creating, prior to creation of the first file system stack and based at least in part on sending the request to initiate the backup, a third file system stack at a third node of the distributed backup system that provides a third path to a third network file share endpoint at the host via a third network file share client at the third node, wherein the first file system stack is created at the first node of the distributed backup system based at least in part on a failure condition or a traffic condition at the third node.

12. The computer-implemented method as recited in claim 1, wherein detecting the request for backing up data comprises determining, in accordance with a service level agreement, that a scheduled time for an ingest of data from the host is satisfied, wherein sending the request to initiate the backup is in response to determining that the scheduled time for the ingest of data from the host is satisfied.

13. A system comprising:
a memory comprising instructions; and
one or more computer processors, wherein the instructions, when executed by the one or more computer processors, cause the system to perform operations comprising:
detecting, by a distributed backup system, a request for backing up data from a host to the distributed backup system;
sending a request, from the distributed backup system to a backup agent executing at the host, to initiate a backup, wherein, based on the request to initiate the backup, the backup agent:
mounts a first network file share endpoint at the host for writing to the distributed backup system and executes a first script that writes a first portion of the data for the backup to the first network file share endpoint; and
mounts a second network file share endpoint at the host for writing to the distributed backup system and executes a second script that writes a second portion of the data for backup to the second network file share endpoint;
creating, based at least in part on sending the request to initiate the backup:
a first file system stack at a first node of the distributed backup system that provides a first path to the first network file share endpoint at the host via a first network file share client at the distributed backup system, wherein the first network file share client is at the first node; and
a second file system stack at a second node of the distributed backup system that provides a second path to the second network file share endpoint at the host via a second network file share client at the distributed backup system, wherein the second network file share client is at the second node,
storing data received by the first file system stack and the second file system stack at the distributed backup system, wherein the first portion of the data for the backup is received by the first file system stack at the first node, and wherein the second portion of the data for the backup is received by the second file system stack at the second node;
detecting, by the distributed backup system, an end of the backup;
sending a command, in response to detecting the end of the backup and from the distributed backup system to the backup agent executing at the host, to end the backup; and
terminating the first file system stack and the second file system stack at the distributed backup system in response to detecting the end of the backup.

14. The system as recited in claim 13, wherein the instructions further cause the one or more computer processors to perform operations comprising:
in response to the command to end the backup, unmounting the first network file share endpoint by the backup agent.

15. The system as recited in claim 13, wherein the distributed backup system comprises a plurality of nodes, wherein the first file system stack is created at one node from the plurality of nodes, wherein an internet protocol (IP) address of the one node with the first file system stack is provided to the backup agent.

16. The system as recited in claim 15, wherein the instructions further cause the one or more computer processors to perform operations comprising:
providing a plurality of channels for backing up data from the host to the plurality of nodes.

17. The system as recited in claim 13, wherein the instructions further cause the one or more computer processors to perform operations comprising:
providing a plurality of endpoints at the distributed backup system, the plurality of endpoints being in communication with the first file system stack for backing up data.

18. The system as recited in claim 13, wherein detecting the request for backing up data comprises determining, in accordance with a service level agreement, that a scheduled time for an ingest of data from the host is satisfied, wherein sending the request to initiate the backup is in response to determining that the scheduled time for the ingest of data from the host is satisfied.

19. A non-transitory machine-readable storage medium including instructions that, when executed by a machine, cause the machine to perform operations comprising:
detecting, by a distributed backup system, a request for backing up data from a host to the distributed backup system;
sending a request, from the distributed backup system to a backup agent executing at the host, to initiate a backup, wherein, based on the request to initiate the backup, the backup agent:
mounts a first network file share endpoint at the host for writing to the distributed backup system and executes a first script that writes a first portion of the data for the backup to the first network file share endpoint; and
mounts a second network file share endpoint at the host for writing to the distributed backup system and executes a second script that writes a second portion of the data for backup to the second network file share endpoint;
creating, based at least in part on sending the request to initiate the backup:
a first file system stack at a first node of the distributed backup system that provides a first path to the first network file share endpoint at the host via a first network file share client at the distributed backup system, wherein the first network file share client is at the first node; and a second file system stack at a second node of the distributed backup system that provides a second path to the second network file share endpoint at the host via a second network file share client at the distributed backup system, wherein the second network file share client is at the second node, storing data received by the first file system stack and the second file system stack at the distributed backup system, wherein the first portion of the data for the backup is received by the first file system stack at the first node, and wherein the second portion of the data for the backup is received by the second file system stack at the second node;

detecting, by the distributed backup system, an end of the backup;

sending a command, in response to detecting the end of the backup and from the distributed backup system to the backup agent executing at the host, to end the backup; and terminating the first file system stack and the second file system stack at the distributed backup system in response to detecting the end of the backup.

20. The non-transitory machine-readable storage medium as recited in claim 19, wherein the instructions, when executed by the machine, cause the machine to further perform operations comprising:

in response to the command to end the backup, unmounting the first network file share endpoint by the backup agent.

\* \* \* \* \*